Figure 15:
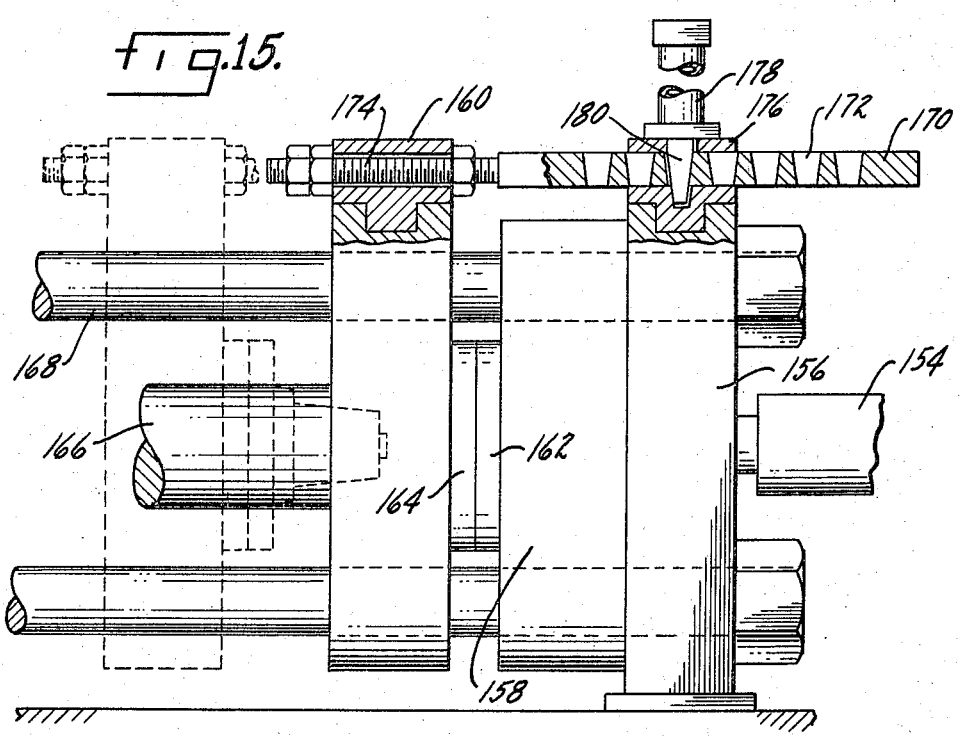

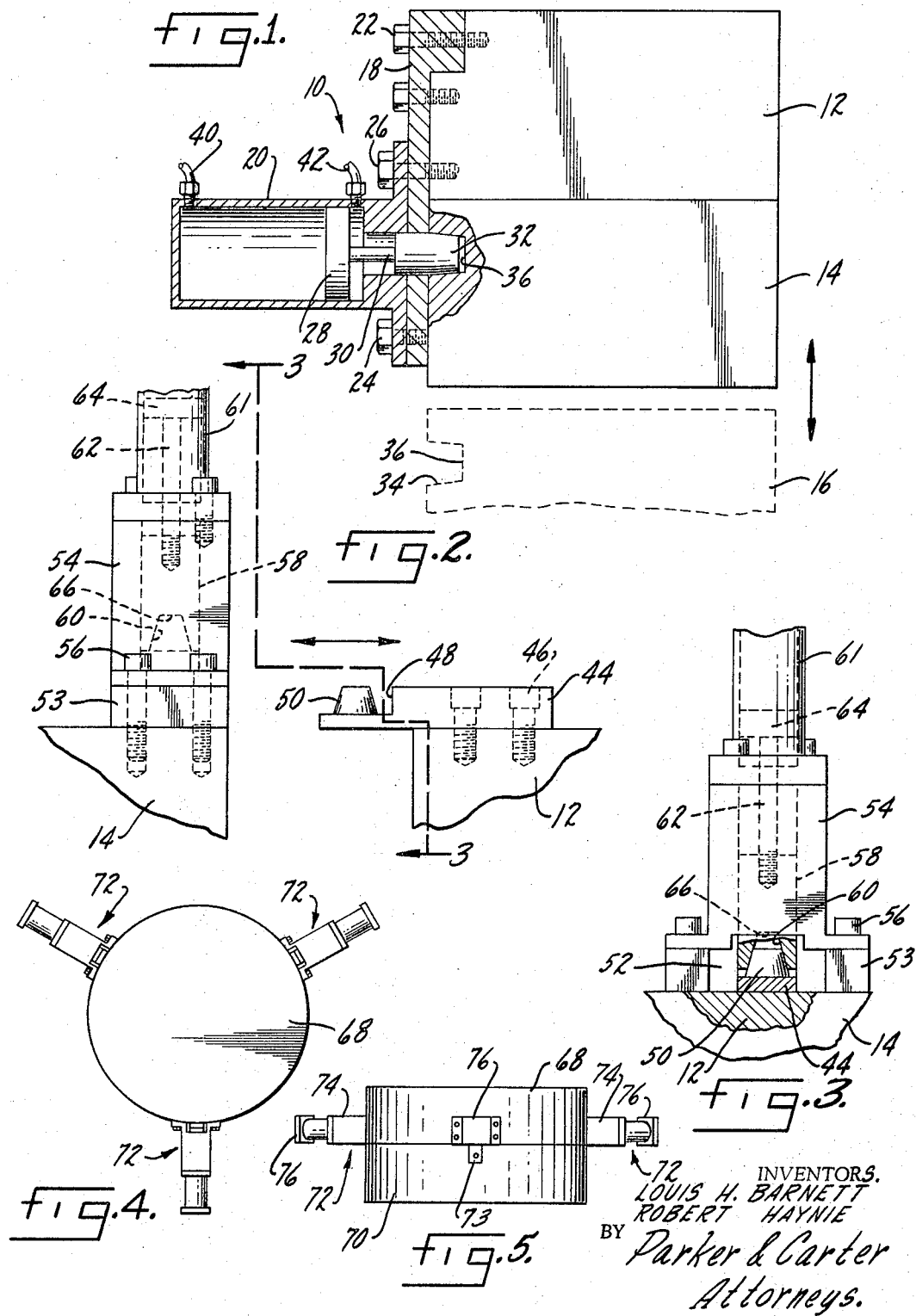

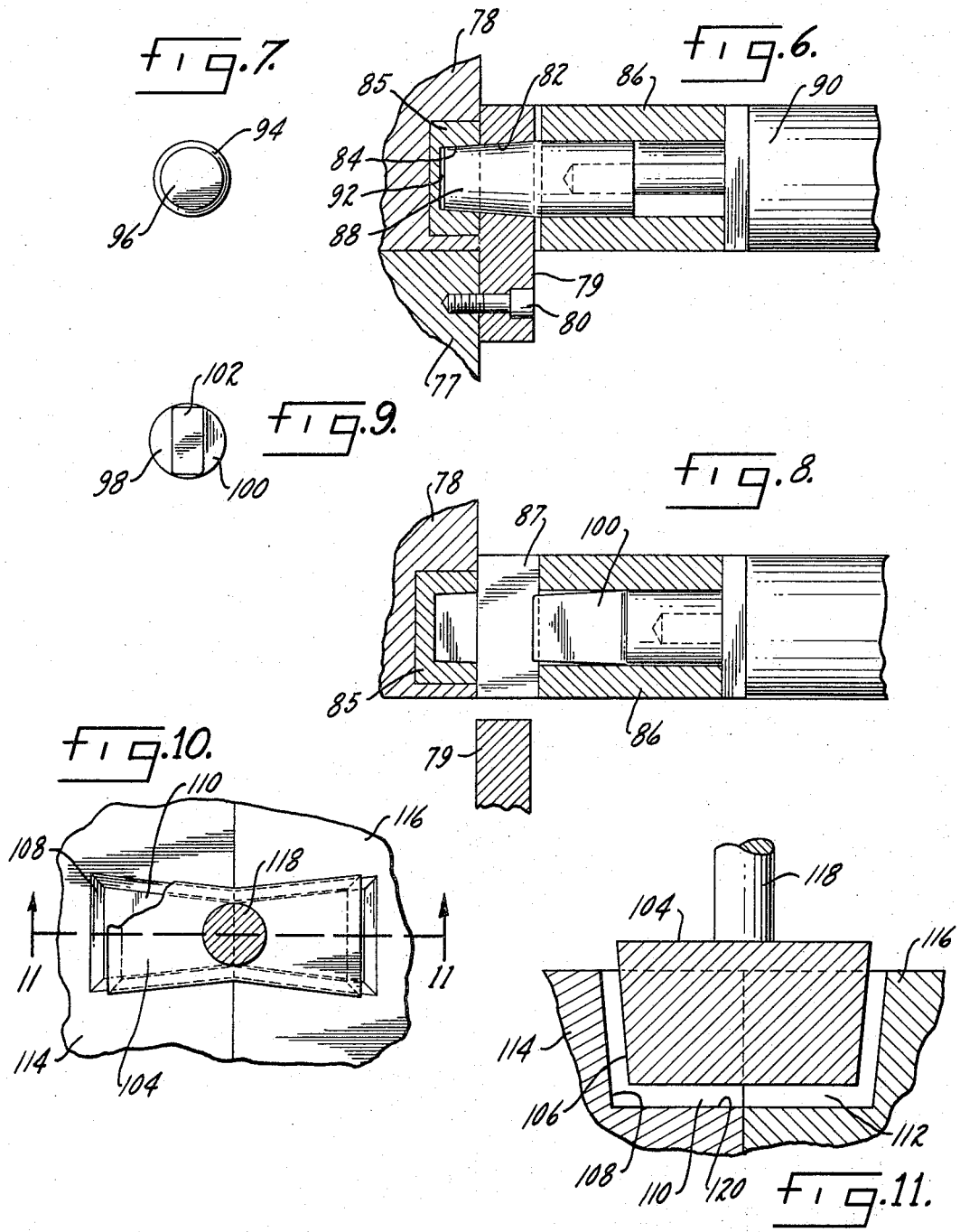

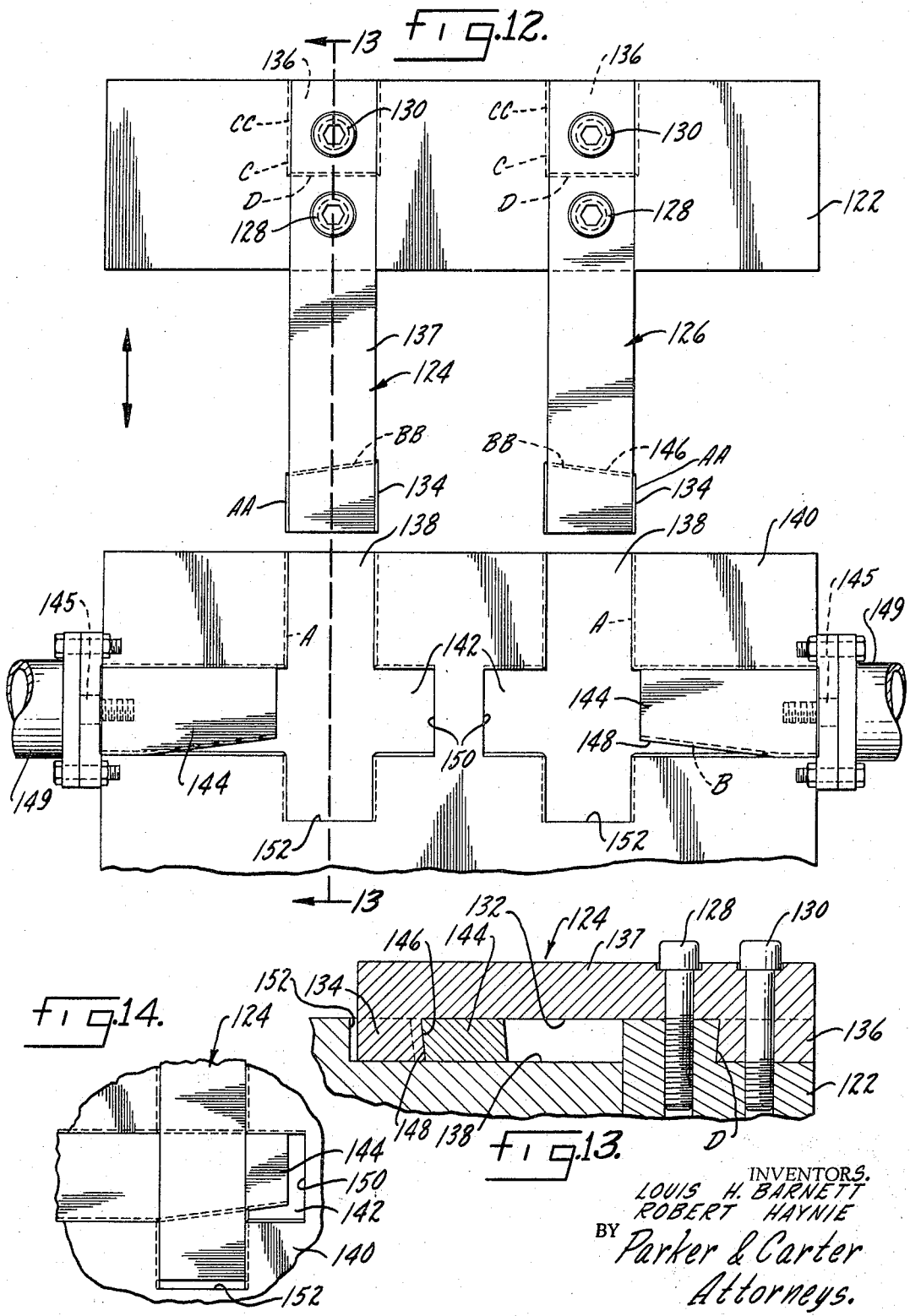

Nov. 21, 1967  L. H. BARNETT ETAL  3,353,221
LOCKING DEVICE FOR INJECTION MOLDING APPARATUS
Filed Nov. 13, 1963  4 Sheets-Sheet 4

INVENTORS.
LOUIS H. BARNETT
ROBERT HAYNIE
BY Parker & Carter
Attorneys.

United States Patent Office 3,353,221
Patented Nov. 21, 1967

3,353,221
LOCKING DEVICE FOR INJECTION MOLDING APPARATUS
Louis H. Barnett and Robert Haynie, Fort Worth, Tex., assignors, by mesne assignments, to Loma Industries, Inc., Cleveland, Ohio, a corporation of Ohio
Filed Nov. 13, 1963, Ser. No. 323,390
6 Claims. (Cl. 18—43)

This invention relates to a clamp device and method for mold parts and particularly relates to a clamping means for all types of molding machines, such as die casting machines, etc. that use a closing force to close a parting line.

A primary object of this invention is a secure clamp which will lock mold segments together during a molding operation by means of mechanical attachments direct to molds or platens or other parts of the machine.

Another object is a faster molding cycle by using a clamping device which permits higher molding pressures.

Another object is a bigger mold and molded part in a press by using a clamping device which permits higher pressures which in turn permits larger areas to be clamped.

Another object is the use of higher injection pressures to make larger mold parts without being limited by the clamping pressure of the press.

Another object is a method of eliminating flash and breakdown of mold surfaces.

Another object is a clamp and method which will reduce the escape of moldable material from the molding areas between mold parts, normally called flash or parting line pressure.

Another object is a clamp and method which holds mold parts together and which adapts to normal wear without losing its locking security.

Another object is a method for clamping mold parts together during a molding operation by using one or more locking units positioned at the separation between mold parts.

Another object is a clamp which is automatically operated in timed sequence to the molding operation so that it is actuated and released in timed relationship to pressure development in the mold.

Another object is a device and method of the above type which can be used on molds with more than two parts.

Another object is a mold lock or clamp which can be used on original equipment or as a conversion kit for field installations.

Another object is an after-market mold lock which is simple and inexpensive to apply.

Another object is a mold clamp to be applied to molding machines in the field which will greatly increase capacity at minimum expense.

Another object is a mold clamp which will provide a uniform clamping or locking action as it wears.

Another object is a mold clamp, either for new equipment or field conversion, which is constructed to provide a maximum locking component with a minimum resistance to release.

Another object is a mold clamp which can be applied in the field to many different types of molding machines, for example injection equipment, blow molding equipment, die casting, explosion forming, etc.

Another object is a clamp which will reduce or eliminate flash.

Figure 16:
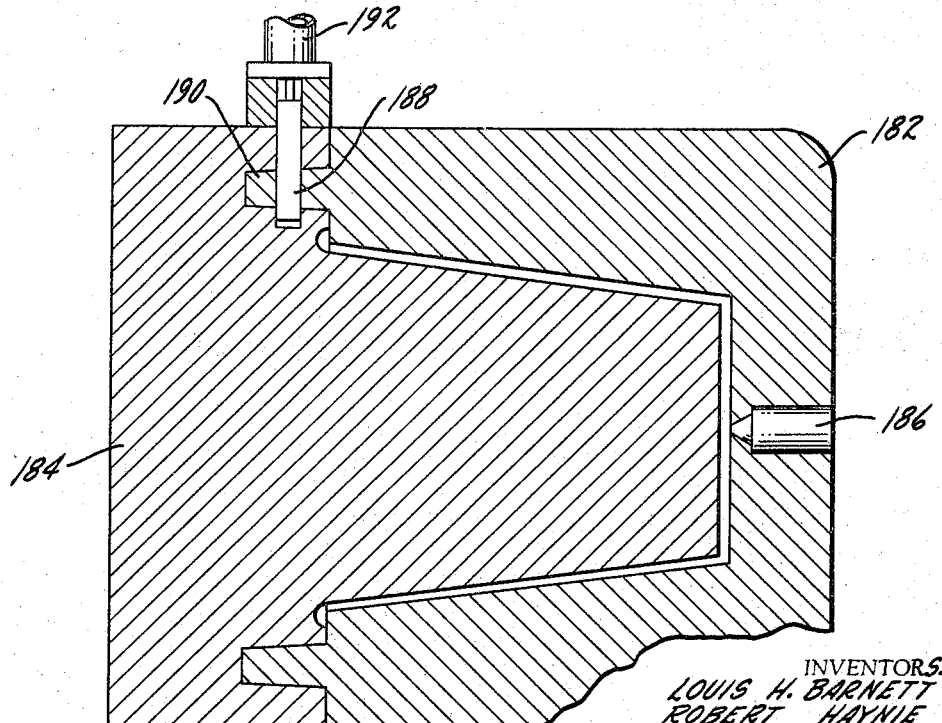

These objects are achieved along with other objects which will become apparent from the following specification and drawings in which:

FIGURE 1 is a partly diagrammatic side view of a locking device on mold parts;

FIGURE 2 is a side view of a modified form;
FIGURE 3 is a section along line 3—3 of FIGURE 2;
FIGURES 4 and 5 are diagrammatic top and side views of a mold with locking devices;
FIGURES 6 and 7 are diagrammatic side and front elevational views, partly in section, of another embodiment;
FIGURES 8 and 9 are diagrammatic side and front elevational views, partly in section, of a similar embodiment with a differently shaped wedge;
FIGURES 10 and 11 are diagrammatic top and side views, partly in section, of another embodiment;
FIGURE 12 is a diagrammatic top plan view of another embodiment;
FIGURE 13 is a section along line 13—13 of FIGURE 12 with the mold closed and locked;
FIGURE 15 is a diagrammatic of a further variation; and
FIGURE 16 is a section of a further variation.

A clamping device generally shown at 10 is mounted on a mold which has separate mold parts 12 and 14. Only two mold parts are shown, but there might be more. The mold part 14 may move away to separated position as shown by phantom outline 16. The mold parts may be on many types of molding machines such as injection molding, blow molding, explosion forming, die casting or the like.

The clamping device as shown is fixed to mold part 12 and includes a rigid arm or strap 18 and a housing or cylinder 20 mounted above. The strap is fixed to the mold part by bolts 22 or the like, but it might be done with simple wedge blocks. The strap overlaps the other mold part. The housing is fixed to the strap by a bolt 24 and a longer bolt 26 which passes through the strap and into the mold part. The cylinder may have a ram 28 to which is connected a piston rod 30 and a wedge element 32. While we have shown the strap as a separate part it might be an integral part of the mold.

The wedge has tapered sides and is shown seated in a tapered passageway 34 which has a bottom 36. The tapered sides or faces of the wedge element snugly fit against a parallel tapered side or face of the passageway to form a positive clamp. The wedge element is fully seated while spaced away from the bottom 36 of the passageway. The wedge is not bottomed so that it may wear and have room to retain its clamping effect.

The wedge element may be actuated in any suitable manner, electrically, mechanically or otherwise, for example by air, hydraulically or by any suitable control. A hydraulic system is indicated by a hydraulic line 40 to actuate the ram, and a line 42 to retract the ram and open the clamp.

Another clamping device is shown in FIGURES 2 and 3 and includes a rigid arm or strap 44 secured to a movable mold part by bolts 46 or the like. The end of the strap is offset, as at 48, to accommodate a fixed wedge element 50. The wedge element is adapted to enter the space 52 formed by spacers, such as 53, supporting a cylinder support 54. The spacers and support may be fixed to the mold part by bolts, such as 56. The cylinder mounting contains a movable clamp element 58 which has a tapered bore or socket 60 in its end. The clamp or socket element may be moved by a power cylinder 61 with the piston rod 62 connected to the clamp and socket element in any suitable manner and moved back and forth by a suitable piston 64.

The piston will be controlled to move so that the tapered passageway seats the wedge element when the movable mold part moves to a closed position against the stationary mold part. Again, the bottom of the wedge will be spaced from the bottom 66 of the tapered socket to accommodate wear.

A plurality of such clamping devices may be distributed in different ways between different types of mold parts. In FIGURES 4 and 5, circular mold parts 68 and 70 are shown and are clamped together by three clamping devices, such as 72 shown spaced at equal angular distances from one another, for example 120° apart. The clamping device 72 may be of the type shown in FIGURES 2 and 3, and the mold part 70 may be movable towards a stationary part 68, or vice versa, whereupon rigid strap 73 will enter raised housing 74, and ram 76 will be actuated to clamp the mold parts together.

In FIGURES 6 and 8, a clamping device is seen in closed and open positions relative to mold parts, such as 77 and 78. The rigid strap 79 is shown fixed to the movable mold part by a bolt 80, but it might be any suitable connecting means. The rigid strap has a tapered passageway which is adapted to register with a tapered socket 84 that may be formed in a hardened insert 85 in the stationary mold. The cylinder support 86 may be fixed to the stationary mold part by means such as shown in FIGURE 3. In any event, the raised housing defines a space 87 to receive one end of the rigid strap until passageway 82 registers with socket 84. The wedge element 88 is then actuated by ram 90 until a positive clamp is formed with the tapered faces of the passageway and the seated element is short of the bottom 92. The wedge elements of FIGURES 7 and 9 are shown as having different slopes. One is an annular wedge having circular wall 94 which tapers downward to a generally flat bottom 96. The other wedge is elliptical with elongated tapered walls 98 and 100 which converge to a generally rectangular flat bottom 102. It will be obvious that other shapes may be devised so long as the wedge element has at least one tapered side. For example, the wedge element of FIGURES 8 and 9 might have one straight wall and the other tapered.

The clamping device of FIGURES 10 or 11 shows a dowel type wedge element 104 to key the mold parts in locked position. This wedge may have tapered ends, such as 106, which are spaced from the ends 108 of the socket. The dovetail sockets 110, 112 in parts 114 and 116 are positioned to form one large tapered socket adapted to receive the dowel wedge. The wedge is moved by piston rod 118 connected to a suitable power means, which is preferably hydraulic, to exert a force sufficient to maintain the wedge seated within the socket. The wedge element is spaced from the bottom 120 to accommodate for wear.

FIGURES 12 through 14 show one mold part 122 with a pair of rigid arms, bands or straps 124, 126 fixed to the mold part by screws or the like, such as 128 and 130. The rigid straps have an undercut portion, such as at 132, which in part forms the tapered passageway for the clamping wedge. The undercut portion is flanked by members 134, 136 extending from overhang 137. Member 136 is shown forming a type of butt joint with mold part 122 and member 134 is adapted to ride in grooves 138 in mold part 140, but it might all be on top with the bolts in shear, or otherwise.

Groove 138 is shown intercepted by transverse grooves 142. Wedge elements 144 are moved in and out of groove 142 by piston rod 145 in cylinder 149, and this movement is controlled by cylinders, not shown. When either one of the mold parts moves to a closed position against the other mold part, the depending member will ride into groove 138 and the undercut portion of the rigid band will intercept the transverse groove. The depending member has a tapered side 148 of the wedge element after it has moved into clamping position, as shown in FIGURE 14. The positive clamp formed by the tapered sides or faces of the ledge and passageway is indicated by phantom line in FIGURE 13. Both grooves have bottoms, such as 150 and 152, which are spaced away from the ends of the wedge and the rigid strip, respectively, to accommodate for wear.

The grooves are shown with sides tapering away from the groove, such as A, to snugly receive a complementary tapered wall AA of depending member 134, a dovetail effect. The wedge element also has an inwardly tapered wall shown in phantom outline, such as B, which is adapted to snugly fit against complementary tapered wall BB of tapered side 146 on the strap. Such tapered walls enhance the clamping effect of the tapered side of the wedge element seated against the tapered side of the passageway and also securely position the strap in the groove. Complementary tapered walls may be provided in other places, such as at C, CC and D, where depending member 136 is joined to mold part 122 to obtain an undercut or dovetail.

The invention may be applied to a platen lock-up arrangement instead of a mold lock-up. For example, in FIGURE 15 the invention has been shown as applied to a portion of an injection molding machine, although it might be otherwise. For example, a suitable injection cylinder is indicated at 154. An anchor platen 156 cooperates with a cavity platen 158 and also with a movable platen 160, the anchor platen and cavity platen carrying suitable mold parts 162 and 164. A clamp cylinder 166, mounted on platens not shown, is adapted to move the movable platen 160 to open and close the molds.

The platens are mounted on suitable strain rods 168 with the movable platen mounted to move along the rods.

A bar 170 having suitably spaced openings 172 is adjustably connected as at 174 by threads and nuts, or any other suitable means, on the movable platen so as to move with it, although it might be reversed. The bar passes through a suitable opening or passage in a mounting 176 which carries a suitable actuating mechanism shown as a cylinder 178 for positioning a tapered wedge element 180 in one of the openings in the bar. It will be noted that the wedge element projects through the bar and into a socket or seat in the mounting. It will be understood that two or more such clamps or lock-ups can be used but only one has been shown. Also, the clamps may be on the sides, or on the top or bottom. In the case of an injection machine with four slide rods and generally rectangular or square platens, one such clamp might be disposed on each corner or one on each side.

The adjustment 174 allows the bar to be differentially positioned so that the tapered wedging surfaces of the wedge 180 will give a tight fit. While the arrangement shown in FIGURE 15 might be most appropriate for aftermarket application or field conversion, it can also be applied as well to original equipment. In the case of original equipment, we could form the notches or grooves or tapered openings 172 in the slide rod 168 with the wedge element 180 mounted on and projecting into the movable platen. There could be such a lock-up on each slide rod or any combination thereof.

Another form is shown in FIGURE 16 in which the cavity 182 and core 184 define any suitable molding cavity, shown in this case as generally cup-shaped. A suitable injection nozzle or device 186 may be used. A guide pin 188, mounted on the side of the mold, may be moved through suitably aligned openings in the mold and an interfitting part 190 with the cavity. Although not shown, the face or faces of the guide pin would be tapered or wedge shaped to give a tight interfit. The pin itself would be actuated by any suitable means, shown in this case as an air cylinder 192, but it might be otherwise. As before, the pins in both FIGURES 15 and 16 should not bottom and are shown as slightly spaced from the bottom of their respective sockets.

The use and operation of the invention are as follows:

Plastic molding machines and others, such as those previously mentioned, are limited by the clamping pressure the ram can develop. This will determine the maximum size part that can be molded, with the part size being determined by the projected area.

By using a clamp or a series of clamps of the type disclosed herein, the size of the part will only be limited by the capacity of the press, meaning the number of cc. that can be injected in each shot, and not by the clamping pressure the machine itself can develop in its ram. In other words, by making the clamping pressure independent of the ram itself, we greatly increase the capacity of the press. This eliminates the expensive closing mechanism used on conventional machines. This would also eliminate the necessity of waiting for the closing mechanism to build up pressure since the attachment clamps, such as shown and described, will immediately apply whatever clamping force is necessary. While we have referred to a ram as the closing mechanism on conventional machines, it should be understood that it could be toggle operated, air actuated, electrical, mechanical or otherwise.

The clamping device and method is applied to molding machines in which high molding pressures are developed, especially when a part is molded with a large projected area, for example a dish pan. Such molds could have air vents, for example from about 0.002 to 0.005 of an inch, to bleed off air as the pressure builds up. The clamping device is used to hold the mold parts together so that the pressures developed in molding such articles do not separate the mold parts and thereby allow molding material to escape or "flash." Previously such mold parts were held together against the pressure developed by the press. Such clamping pressure was the limiting factor which determined the maximum size of the part which could be molded. This no longer is a limiting factor because bigger molds can be placed in smaller presses and the clamping pressure of the press will be determined by the clamping device.

The clamping device also permits faster molding because higher injection pressures may be used to obtain a fast cycle. An injection molding machine which may be advantageously adapted for the clamping device and method is one which uses a high pressure cycle followed by a low pressure holding cycle. The clamping device is preferably locked during the high pressure cycle and may be released during the low pressure cycle. The clamping device may also be unlocked during the curing and cooling cycle at low pressures. As an example, the time sequence may require the high pressure cycle to operate only for a few seconds, during which time the clamps would be locked. The low pressure curing and cooling cycle might require about 30 seconds, during which time the clamp would be unlocked. The invention, however, is not limited to any particular molding procedure.

The clamping devices may be used on mold parts which move away from each other. The number of clamping devices used may vary. It is not important how the mold parts move away from each other or what mold part is stationary and which are movable. The mold parts may move away from each other axially or they may be hinged at one part to open like jaws, as in book molds. Thus, the mold parts in FIGURE 1 could be hinged on the side away from the clamping device. While one clamping device has been shown in FIGURE 1, it is, of course, understood that they may be placed at the bottom as well as the sides to secure a good lock.

The straps may be dimensioned and placed to make certain that the mold parts will not bow outward even though the clamp remains rigidly locked. Rigid straps or other holding structures may be used as part of the clamp to hold the mold parts securely together.

The tapered faces of the passageway and wedge element should form a positive clamp in the sense that they are matched by being carefully ground to parallelism. While a positive clamp may be variously formed, it is preferred that the angle of the faces be not substantially less than 3° and not substantially more than 30°. An angle substantially under 3° will make it difficult for the wedge element to be unlocked after molding. An angle more or substantially more than 30° will lock tight but will produce too large a force component during molding tending to open the clamp. While we have specified 3° to 30° as limits, it should be understood that this may vary somewhat. The wedge element may also be desirably designed to rotate on its piston rod as it is removed and inserted to provide a different positive clamp face in each locking position to thereby minimize wear.

The control means for moving the wedge element in and out of the tapered passageway is preferably automatically controlled so that a fast moving cycle may be provided. It is, however, apparent that the advantages of the device and method may be realized by semi-automatic movement or even by hand.

The invention has the advantage that the clamps may be supplied as a separate unit or kit to be applied to molding machines in the field. In addition to after-market use, the clamps may be built into new construction. For example, the clamp shown in FIGURES 6 through 9 may be advantageously used on new equipment where sockets can be formed in the mold parts during original manufacture. But this would prove difficult in the field. So a unit such as in FIGURE 2 would be better for after-market application since it only has to be mounted on existing molds. By the same token, a lock such as in FIGURE 12 might well be better for original equipment since it otherwise might require extensive mold revision. But, on the other hand, a unit such as in FIGURE 2 might quite easily be used also on new equipment.

It should be noted that in all forms the locking parts themselves are in shear when resisting mold pressures. This arrangement, along with the 3° to 30° limits, provides the highest possible clamping resistance to molding pressure.

We have indicated that a number of different types of operating mechanisms could be used to actuate the clamps, and it should be understood that the invention is totally unlimited as to whether the clamps are hydraulically, mechanically, pneumatically, electrically operated or otherwise.

The invention relieves the wear and tear on the molding equipment and, therefore, greatly prolongs its over-all life and length of trouble-free periods. Both maintenance saving and power saving are substantial.

The molds may be square, round, oblong or any shape. Quite naturally, the mold shape will determine or influence the arrangement or the disposition of the clamps. The number of locks used only needs to be related to the tonnage involved so that sufficient total clamping pressure is available to keep the mold closed and the press locked. All mating surfaces of both the mold and the locks should be accurately ground and in accurate parallelism.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:

1. In a pressurized molding device having linearly separable mold parts, a clamp to hold the mold parts together against separating pressures, which includes a wedge element with a tapered face, a passageway associated with a mold part, said passageway having a bottom and at least one tapered face, the wedge face being dimensioned to form a positive clamp with the tapered face of the passageway, said wedge element adapted to be short of the bottom when in its clamping position, and means to hold the wedge in the mold part so that the mold parts are locked while the wedge is seated, said clamp being further characterized in that each mold part has open and aligned passageways so that a larger passageway is formed and keyed by a dowel wedge element when the molded parts are together.

2. In a pressurized molding device having linearly separable mold parts, a clamp to hold the mold parts together against separating pressures, which includes a wedge element associated with one mold part, at least one tapered face parallel to the wedge face to form a positive clamp, said wedge element adapted to be seated short of the bottom, and means connected to the wedge element to hold the mold parts together when the wedge is seated said clamp being further characterized in that the wedge is positioned on a rigid arm extending from one mold part and overlapping the other mold part, and said wedge is adapted to be seated in a passageway associated with the other mold.

3. In a pressurized molding device having linearly separable mold parts, a clamp to hold the mold parts together against separating pressures, which includes a wedge element with a tapered face, a passageway associated with a mold part, said passageway having a bottom and at least one tapered face, the wedge face being dimensioned to form a positive clamp with the tapered face of the passageway, said wedge element adapted to be short of the bottom when in its clamping position, and means to hold the wedge in the mold part so that the mold parts are locked while the wedge is seated, said clamp including a rigid arm affixed to one mold part and overlapping the other mold part with said arm having an aperture aligned with said passageway.

4. A lock as in claim 2 further characterized in that the tapered passageway is in one mold part and the wedge is actuated by a movable member mounted on a rigid member extending from the other mold part.

5. The structure of claim 3 further characterized in that said wedge element is supported for movement into and out of said passageway by a piston rod connected to a ram.

6. The structure of claim 5 further characterized in that said wedge element is adapted to rotate as it is moved into and out of said passageway to provide a different positive clamp face in each locking position.

References Cited
UNITED STATES PATENTS

| | | | |
|---|---|---|---|
| 228,151 | 4/1880 | Wilson | 20—92.4 |
| 472,088 | 4/1892 | Walker | 292—175 |
| 799,871 | 9/1905 | Savard | 249—167 |
| 1,126,351 | 1/1915 | Beabes | 20—92 |

J. SPENCER OVERHOLSER, *Primary Examiner.*

E. MAR, *Assistant Examiner.*